Dec. 12, 1944.  H. N. ATWOOD  2,364,597
PRESS
Filed March 9, 1942
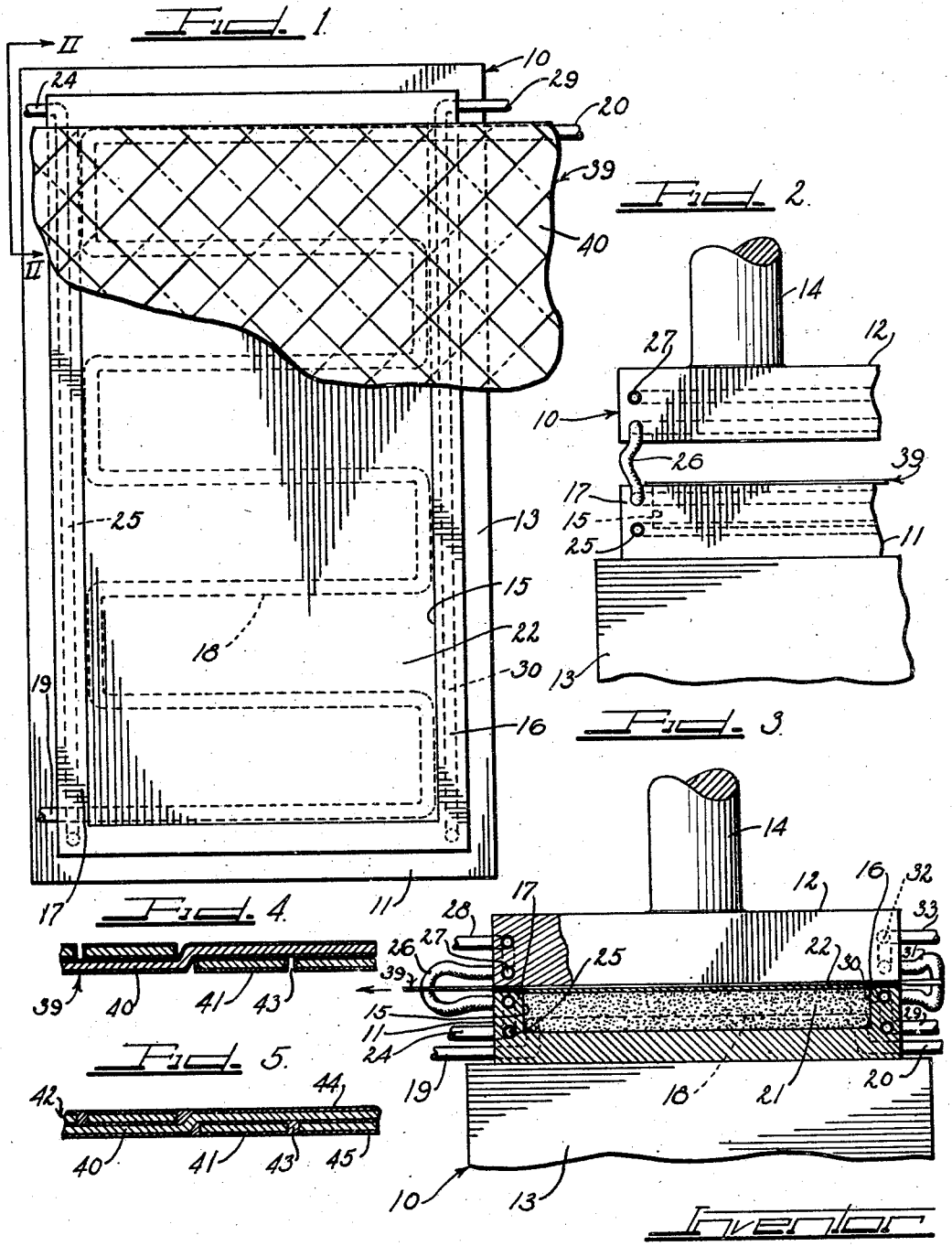
Inventor
HARRY N. ATWOOD Patented Dec. 12, 1944

2,364,597

UNITED STATES PATENT OFFICE 2,364,597

PRESS

Harry N. Atwood, Mellen, Wis., assignor to Penokee Veneer Company, Mellen, Wis., a corporation of Wisconsin Application March 9, 1942, Serial No. 433,892

4 Claims. (Cl. 144—281)

This invention relates to a press and more particularly to a press for bonding together web material coated with thermosetting or thermoplastic material requiring a relatively high temperature for activation as a bonding material.

In my Patent No. 2,126,711, which issued August 16, 1938, I have described and claimed sheet material formed from interwoven strips coated with and imbedded in a thermoplastic material. The present invention has to do with a press for effecting the bonding together of sheet material on this order to form a more or less continuous web.

One of the difficulties encountered in the compression and bonding together of such interwoven strips coated with thermosetting or thermoplastic material is in preventing any excessive crushing that would reduce the strength of the material from which the strips are formed. This is especially true where the strips are formed from wood veneer, since then there is a tendency to crush the fibers of the wood veneer strips at the edges of the overlapping strips. If the sheet material were to be compressed between platens having rigid plane surfaces, such crushing action would be inevitable due to the impossibility, in practice, of maintaining absolutely uniform pressure throughout that area of the sheet material that lies between the cooperating platens. This is due partly to variations in thickness of the strips of wood veneer but mostly to the variations in thickness inherent in any interwoven material. It has been proposed to compensate for such variations by providing a press including a platen cooperating with a flexible distensible member such as a rubber bag which may be subjected to internal expansive fluid pressure to cause a surface thereof to cooperate with the working face of the rigid platen. The pressure thus exerted against one surface of the interwoven strip material is a yielding one which is uniform over such surface regardless of high and low spots thereon caused by variations in thickness. However, at relatively high temperatures rubber deteriorates and no other suitable materials of construction for the above mentioned flexible distensible members are available.

According to my present invention, variations in thickness of the interwoven material are compensated for by providing a press including one rigid platen cooperating with another platen having a recessed working face filled with a finely divided solid material such as sand, which under pressure will redistribute itself to compensate for local irregularities in the surface configuration of the woven strip material.

Another problem in the continuous bonding together of sheet material in a heated press where a thermoplastic or thermosetting bonding medium is involved is that of preventing preheating and reheating of the bonding material as successive areas of sheet material are moved through the press. If contiguous sheet material areas are treated successively in a heated press, the leading margin of the area next to be treated will be in close vicinity to the press while a given area is being treated. At the same time, the area which has just been treated will have its trailing edge in close vicinity to the heated press. Such reheating of thermoplastically bonded material causes softening and often bubbling of the thermoplastic, with the result that uniformity in appearance and strength of the bond is destroyed. Reheating also often has an adverse effect on thermoset bonded material. Preheating of material to be bonded by thermosetting will cause setting of the bonding material before the sheet material has been subjected to forming in the press. Preheating of thermoplastic material may cause losses due to flow of material liquefied outside of the press.

This problem is solved in the press of my invention, which is provided with locally cooled exit and entrance platen edges. Conduits through which a cooling liquid is circulated are provided in the cooperating margins of the platens or equivalent press parts at the exit and entrance sides of the press to maintain successive portions of the web lying therebetween or adjacent thereto before and after pressing in a cool condition notwithstanding the proximity of such portions to the heated area of the press parts. Consequently, the preheating of as yet unbonded parts and the reheating of once bonded parts as previously referred to does not occur and uniformity in appearance and in character and strength of bond can be maintained along the entire length of web material.

It is therefore an important object of this invention to provide a press embodying the features of novel and improved construction explained above.

It is a further important object of this invention to provide a press operative at relatively high temperatures for the continuous compression and bonding of webs formed of interwoven strips of wood veneer or the like wherein pressure is applied to the web to be bonded confined between one rigid platen surface and another platen having a recessed working surface filled with a finely divided solid material capable of redistributing itself under pressure to compensate for local surface irregularities in the web, whereby a uniform surface pressure may be exerted regardless of the unevenness of the surfaces of the web material and of the variations in the thickness of the web material.

It is a further important object of this invention to provide a press for the continuous compressing, at relatively high temperatures, of sheet material coated with thermoplastic or thermosetting material, with means along the entrance and exit edges of the press for localized cooling of the coated sheet material in order to prevent preheating or reheating of the thermoplastic or thermosetting material along such edges due to conduction or radiation of heat from the heated portion of the press to sheet areas contiguous with any one sheet area being treated in the press.

Other and further important objects of this invention will be apparent from the disclosures in the specification and the accompanying drawing.

This invention (in a preferred form) is illustrated in the drawing and hereinafter more fully described.

On the drawing:

Figure 1 is a plan view of the lower half of a press embodying the principles of my invention, illustrating a web of the sheet material to be bonded together by the operation of the press.

Figure 2 is an enlarged fragmentary view of the whole press taken substantially along the line II—II of Fig. 1.

Figure 3 is an enlarged end view, partly in section, of the press as filled with sand, illustrating its operation.

Figure 4 is an enlarged sectional view of interwoven sheet material prior to the pressing operation.

Figure 5 is an enlarged sectional view of the interwoven sheet material after the pressing operation has been completed.

As shown on the drawing, the reference numeral 10 indicates generally a press embodying the features of construction of my present invention. Said press includes a lower member 11 and an upper member 12 adapted to cooperate therewith. As shown, the lower press member is stationarily mounted upon a support 13, while the upper press member is mounted for reciprocal movement upon a plunger shaft 14. Mechanism for effecting relative movement between the press parts 11 and 12 may be of any standard or conventional construction.

The lower press member 11 is provided with a shallow rectangular recess 15 which occupies substantially the entire area of the working face of said member 11, except for relatively narrow marginal portions, including the front or inlet marginal portion 16 and the rear or exit marginal portion 17. A heating coil 18 is positioned on the bottom of the recess 15 and is provided with entrance and exit portions 19 and 20 extending through walls of the member 11. The recess 15 is filled with fine, flowable sand 21 or other pulverulent solid material capable of flowing more or less like a liquid. A flexible thin metal sheet 22 of the dimensions of the recess 15 rests upon the sand and is held slightly above the top surfaces of the margins about said recess by the sand 21.

A cooling conduit 24 is provided for the introduction of a cooling fluid into ducts 25 formed in the exit margin 17 of said lower press member 11. From the ducts 25, the cooling fluid is conducted by means of a flexible hose 26 to similar ducts 27 formed in the upper corresponding edge of the press part 12. From these ducts 27, the cooling fluid is discharged through a pipe or conduit 28.

A similar cooling conduit 29 is provided for the front or entrance margin 16 of the lower press member 11. The conduit 29 communicates with ducts 30 formed in the front margin 16 of the press member 11 and, through a flexible hose 31, with like ducts 32 formed in the corresponding margin of the upper press member 12. The cooling fluid is discharged through a pipe or line 33.

The reference numeral 39 indicates generally a web of material that is to be pressed or molded within the press head. The web illustrated is formed of interwoven strips 40 of wood veneer, which strips have been coated with a plastic material 41 prior to the weaving operation. This type of web material is described and claimed in my Patent No. 2,126,711, dated August 16, 1938. The individual ribbons or strips, such as the strips 40 (Fig. 4) are individually encased within a synthetic plastic material that serves both to coat and thus to protect the material of the ribbons or strips and also to bond the ribbons or strips together and rigidify them into a form-retaining finished sheet 42 (Fig. 5). For the purposes of the present invention, the sheet 39 may be in the form of a more or less continuous web, the continuity of which is made possible through the method of interweaving the strips 40 in the manner shown.

Before the web 39 has been subjected to the pressing operation, the strips 40 are merely in a loosely interwoven condition, without any bonding of the strips together through their plastic coating 41. The purpose of the pressing operation is to cause the plastic material of the coating 41 to flow and effect a bond between the interwoven strips, as well as to fill in the spaces, as at 43, between the ribbons or strips as at points of cross over. By the use of the press herein described, the pressing and bonding operation may be carried out on a web of indefinite length, rather than on separate sheets that conform in size to the areas of the platens of the press.

In the operation of the press, the sheet material 39 is introduced between the spaced press parts 11 and 12, and the parts then brought firmly together, steam or some other heated fluid being circulated through the coil 18. The plate 22 being thin enough to accommodate itself to the form of the web 39, and the sand 21 being able to flow like a liquid when subjected to pressure, the whole area of the web 39 exposed to the action of the press members 11 and 12 is subjected to a uniform pressure. The heat transmitted from the coil 18 serves to fuse the plastic coating 41 on the individual strips 40, with the result that such plastic material forms a continuous coating, such as the coating layers 44 and 45 over the broad surfaces of the composite sheet 42 and also flows between the strips 40 to fill the interstices thereof as at 43. If the plastic bonding material 41 is thermosetting, the bonding material is simultaneously set.

The amount of pressure exerted by the upper press member upon the sheet 39 and the temperature of the heated fluid within the coil 18 will depend upon the particular characteristics of the thermoplastic or thermosetting and initially plastic material that is employed as the bonding agent for the sheet material. The press of this invention is operative at temperatures exceeding 300° C. Pressures may be varied from a few pounds to a few hundred pounds per square inch. Higher pressures can be used without danger of crushing the fibers of the wood veneer strips 40 because of the uniformity with which the pressure is distributed over the sheet material through the sand 21. Although the press parts 11 and 12 may be forced together under considerable pressure, no crushing effect is produced along the marginal portions 16 and 17, where rigid surfaces of the press parts oppose each other, for the plate 22 is raised slightly above the margins 16 and 17. The sheet 39 is of such width as to lie between the end margins of the press part 11.

After completion of the pressing operation, which may require only a few minutes' time, the upper press part 12 is elevated sufficiently to permit the web material 39 to be advanced substantially by the width of the recess 15 into position for the next contiguous web area to be subjected to the pressing and bonding operation. As the web material 39 is advanced in this step-by-step fashion, sufficient cooling takes place to permit any fused thermoplastic that may be used to harden, but if it were not for the provision of the cooled exit edge of the lower press part 11, there would occur a reheating and resoftening of that portion of the thermoplastic material that comes into contact with said exit edge 17, due to conduction of heat from the coil 18 into the marginal portion 17 of the press part 11, and also due to conduction of heat along the web material itself. By circulating a cooling fluid, such as cold water, through the conduits 25, however, the exit edge of the press part 11 is kept in a comparatively cooled condition, with the result that softening of the thermoplastic material in contact with such edge is prevented.

Similarly, circulation of cold water or the like through the conduits 30 in the entrance edge 16 prevents preheating and premature setting of any thermosetting bonding material used when the leading margin of a web area is held adjacent the edge 16 while the contiguous web area ahead is being treated and formed in the press. It is thus possible by the use of a press constructed as described to eliminate any lack of uniformity in the appearance and character of either thermoplastic or thermosetting coating and bonding material.

Any suitable fluid heating medium, including steam, may be introduced into the coil 18. Alternatively, the coil 18 may be omitted, but the upper press part 12 may be provided with heating means, or the upper part 12 may be heated in addition to the heat supplied from the coil 18. Since the upper press part 12 would, in any event, become heated through association with the heated lower press part 11, it is necessary to provide for the cooling of the edges of the upper press part that correspond with the entrance edge 16 and the exit edge 17 of the lower press part. This is accomplished, as previously described, by providing the passages 27 and 32 in the upper press part 12 and connecting these passages by flexible hoses 26 and 31 with the similar passages 25 and 30 in the lower press part 11.

In place of sand, any other suitable finely divided solid medium capable of flowing under pressure may be used, such as salt ground to sufficient fineness. If desired, the plate 22 may be omitted. In the absence of the plate 22, small amounts of the sand or other pulverulent medium used to distribute pressure at a relatively high temperature tend to adhere to one surface of the web material. For some purposes, the presence of such adherent finely divided solid material on one side of the finished sheet material is unobjectionable or even desirable. Adherent salt can be removed by simple washing with water.

It is thus possible by the use of a press embodying the novel features herein described to press or mold a continuous web of material at any desired length at relatively high temperatures, more particularly, at temperatures above those at which rubber or like material can be used. The operations described can be carried out in connection with the pressing and bonding of web material coated either with a thermoplastic or with a thermosetting bonding medium such as thermosetting phenol-aldehyde condensation products, phenol-furfural condensation products, intermediate products in the formation of melamine resins, urea-formaldehyde condensation products and like material. When thermosetting bonding agents are employed, the individual strips of the material to be bonded together are coated with a potential resin forming composition in the intermediate stage in which it is still plastic and fusible and capable of being converted into the final or infusible stage.

While the invention has been described in connection with web or sheet material formed of interwoven strips, it is evident that sheets of wood veneer or the like may be laminated in the press of my invention in much the same way as that herein described. Since, however, it is impossible to secure veneer sheets of any considerable length, the use of interwoven strips affords the most practical way of producing webs of indefinite length.

It will, of course, be understood that various details of construction may be varied through a wide range without departing from the principles of this invention and it is, therefore, not the purpose to limit the patent granted on this invention otherwise than necessitated by the scope of the appended claims.

I claim as my invention:

1. A press adapted for treating sheet material including relatively movable press parts having opposed faces, one of said faces having a recess and filled with finely divided solid material capable of redistribution under pressure to accommodate itself to the form of sheet material being pressed, means for heating a portion of one of said press parts intermediate the margins thereof, means for cooling the margins of one of said press part faces so that sheet material of appropriate dimensions inserted between said faces and extending beyond said finely divided solid material across said margins will be heated only at the part aligned with said recess.

2. A press adapted for treating sheet material by successively subjecting contiguous areas thereof to pressure as the sheet is progressed therethrough including relatively movable press parts having opposed faces, one of said faces being recessed and filled with finely divided solid material capable of redistribution under pressure to accommodate itself to the form of sheet material being pressed, the other press part having a plane face means for heating said finely divided solid material in said recessed press part, and means for cooling the entrance and exit margins of said recessed face so that sheet material of appropriate dimensions inserted between said faces and extending across said cooled margins will be pressed and heated only between said finely divided solid material and portions of the non-recessed face opposed thereto.

3. A press including a pair of rectangular platens between which sheet material is to be progressively fed to successively compress contiguous areas thereof, means for heating a portion of one of said platens, the face of said heated platen being rectangularly recessed inside the margins thereof, means for cooling the entrance and exit margins of said platens, a finely divided solid material filling said recess, and a thin metal plate closing said recess, the top surface of said plate being disposed on a level above the margins surrounding said recess, whereby sheet material inserted between said platens is heated and compressed only over the area of said plate.

4. In a press including a pair of relatively movable platens between which strip material is to be progressively fed to successively compress contiguous areas thereof, means for heating a portion of one of said platens, means along entrance and exit edges of said platens for locally cooling said edges, one of said platens being provided with a recess in its working face, a finely divided solid material filling said recess and a thin metal plate resting on top of said solid material for transmitting pressure uniformly to said strip material.

HARRY N. ATWOOD.